United States Patent
Yang et al.

(10) Patent No.: US 9,247,190 B2
(45) Date of Patent: Jan. 26, 2016

(54) APPARATUS AND METHOD FOR OUTPUTTING CONTENTS INFORMATION

(75) Inventors: Do-jun Yang, Yongin-si (KR); Eun Namgung, Suwon-si (KR); In-chul Hwang, Suwon-si (KR); Zhang-hoon Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1537 days.

(21) Appl. No.: 11/926,404

(22) Filed: Oct. 29, 2007

(65) Prior Publication Data

US 2008/0226260 A1 Sep. 18, 2008

(30) Foreign Application Priority Data

Mar. 15, 2007 (KR) ........................ 10-2007-0025705

(51) Int. Cl.
| | |
|---|---|
| *H04N 9/80* | (2006.01) |
| *H04N 5/765* | (2006.01) |
| *H04N 7/01* | (2006.01) |
| *H04N 5/77* | (2006.01) |
| *H04N 5/782* | (2006.01) |
| *H04N 9/82* | (2006.01) |

(52) U.S. Cl.
CPC ............ *H04N 5/765* (2013.01); *H04N 7/0122* (2013.01); *H04N 5/77* (2013.01); *H04N 5/782* (2013.01); *H04N 9/8205* (2013.01); *H04N 9/8227* (2013.01)

(58) Field of Classification Search
CPC ....... H04N 5/765; H04N 7/0122; H04N 5/77; H04N 5/782; H04N 9/8205; H04N 9/8227
USPC ................ 386/348, 333–335, 278, 239, 243
See application file for complete search history.

(56) References Cited

U.S. PATENT DOCUMENTS

| | | | |
|---|---|---|---|
| 7,493,490 B2* | 2/2009 | Tanner et al. ................. | 713/176 |
| 8,910,051 B2* | 12/2014 | Lussier .................. | G11B 7/034 |
| | | | 386/281 |
| 2004/0131184 A1* | 7/2004 | Wu et al. ....................... | 380/202 |
| 2005/0065972 A1* | 3/2005 | Haines .................. | H04L 69/329 |
| | | | 1/1 |
| 2006/0259926 A1* | 11/2006 | Scheelke et al. ................ | 725/48 |
| 2006/0265592 A1 | 11/2006 | Tsuchida et al. | |
| 2007/0050397 A1 | 3/2007 | Hokimoto | |

(Continued)

FOREIGN PATENT DOCUMENTS

| | | |
|---|---|---|
| CN | 2814831 Y | 9/2006 |
| JP | 2006-253984 A | 9/2006 |

(Continued)

OTHER PUBLICATIONS

Communication dated Apr. 15, 2011 from the State Intellectual Property Office of P.R. China issued in a counterpart Chinese Application No. 200810086083.5.

(Continued)

*Primary Examiner* — Helen Shibru
(74) *Attorney, Agent, or Firm* — Sughrue Mion, PLLC (57) ABSTRACT

An apparatus and method for outputting content information are provided. The apparatus includes a detection unit which detects a connection of a source device, a generator which generates metadata related to the source device, a storage unit which stores content stored in the source device and the metadata, a loader which classifies the content based on the metadata, and an output unit which outputs the classified content on a display screen.

9 Claims, 9 Drawing Sheets

(56) References Cited

U.S. PATENT DOCUMENTS

| | | | |
|---|---|---|---|
| 2007/0248311 A1* | 10/2007 | Wice et al. | 386/52 |
| 2007/0274689 A1* | 11/2007 | Stone | 386/123 |
| 2007/0282908 A1* | 12/2007 | Van der Meulen et al. | 707/104.1 |
| 2008/0195573 A1* | 8/2008 | Onoda et al. | 707/1 |
| 2008/0273862 A1* | 11/2008 | Okamoto et al. | 386/123 |
| 2008/0320157 A1* | 12/2008 | Sather | G11B 27/034 709/231 |
| 2009/0322904 A1* | 12/2009 | Takahashi | G11B 27/034 348/231.3 |
| 2010/0251306 A1* | 9/2010 | Oh | 725/51 |

FOREIGN PATENT DOCUMENTS

| | | |
|---|---|---|
| JP | 2006-311269 A | 11/2006 |
| KR | 10-2001-0076434 A | 8/2001 |
| KR | 1020040026388 A | 3/2004 |
| KR | 10-2006-0088681 A | 8/2006 |
| KR | 10-2006-0118274 A | 11/2006 |
| WO | 2005/048581 A2 | 5/2005 |

OTHER PUBLICATIONS

Communication dated Nov. 28, 2013, issued by the Korean Intellectual Property Office in counterpart Korean Application No. 10-2007-025705.

Communication, dated Feb. 27, 2013, issued by the Korean Patent Office in counterpart Korean Application No. 10-2007-0025705.

\* cited by examiner

APPARATUS AND METHOD FOR OUTPUTTING CONTENTS INFORMATION

CROSS-REFERENCE TO RELATED APPLICATION

This application claims priority from Korean Patent Application No. 10-2007-0025705, filed on Mar. 15, 2007 in the Korean Intellectual Property Office, the disclosure of which is incorporated herein by reference in its entirety.

BACKGROUND OF THE INVENTION

1. Field of the Invention

Apparatuses and methods consistent with the present invention relate to outputting contents information, and more particularly, to outputting contents information, in which once a source device is connected to an Internet Protocol television (IPTV), contents stored in the source device and information related to the contents are automatically stored in a storage device in the form of metadata and the metadata is output on a screen of the source device, thereby enabling contents desired by a user to be run even after the source device is disconnected from the IPTV.

2. Description of the Related Art

A mobile device may be connected to a digital television (DTV) by communication means such as Universal Serial Bus (USB), IEEE 1394, Bluetooth, or the like, and enables digital contents to be recorded, written or read. Here, the term "contents" means all types of information that can be viewed under the control of a user and encompass moving images, sound, music, voice, photos, and so on. Examples of mobile devices include personal digital assistants (PDAs), personal communication systems (PCSs), mobile phones, camcorders, personal video recorders (PVRs), digital cameras, MP3 players, and so on.

Figure 1:
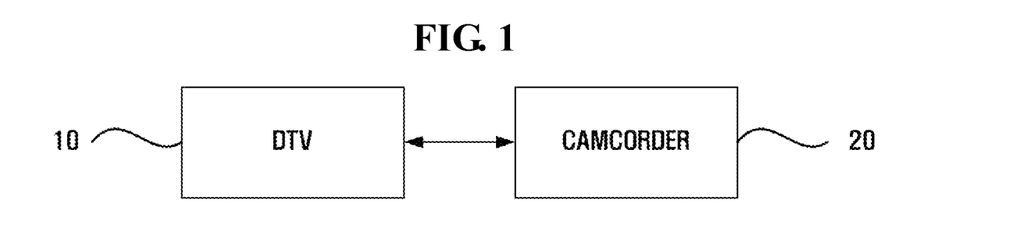
FIG. 1 is a conceptual diagram of a related art DTV for displaying contents of a camcorder.

As shown in FIG. 1, in order to display content stored in a camcorder 20 on a DTV 10, a user may connect the camcorder 20 to the DTV 10. First, the user stores the content stored in the camcorder 20 in his or her personal computer (PC), prior to displaying the content stored in the camcorder 20 through an output device of the DTV 10. To this end, a plug and play (PNP) interface such as USB is used and a connection between the PC and the DTV 10 is established through several operations.

In a case where the DTV 10 does not support sharing of data of the PC or is not capable of communicating with the PC, a separate output line for connecting an output port of the PC storing the content of the camcorder 20 with an input port of the DTV 10 is required, and undesirable deterioration of picture quality may result.

SUMMARY OF THE INVENTION

The present invention provides an apparatus and method for outputting contents information, in which once a source device is connected to an IPTV, contents stored in the source device and information related to the contents are automatically stored in a storage device in the form of metadata and the metadata is output on a screen of the source device, thereby enabling contents desired by a user to be run even after the source device is disconnected from the IPTV.

According to an aspect of the present invention, there is provided an apparatus for outputting content information including a detection unit which detects a connection of a source device, a generator which generates metadata related to the source device, a storage unit which stores content stored in the source device and the metadata, a loader which classifies the content based on the metadata, and an output unit which outputs the classified content on a display screen.

According to another aspect of the present invention, there is provided a method for outputting content information including detecting a connection of a source device, generating metadata related to the source device, storing content stored in the source device and the metadata in a storage device, and classifying the content based on the metadata and outputting the classified content on a display screen.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

IPTV is a service in which a variety of information, moving image contents, broadcasting services, and so on are provided through a television (TV) receiver over ultrahigh-speed Internet. IPTV, which incorporates both Internet and TV services, is a type of digital convergence. However, IPTV is different from a conventional Internet TV in that a TV receiver, rather than a computer monitor, is used and a remote control, rather than a mouse, is used. IPTV service can be utilized simply by connecting a TV receiver, a set-top box, and an Internet channel. That is to say, a set-top box or an exclusive modem is connected to a TV receiver and then power is applied to turn on the TV receiver, thereby effectuating the IPTV service.

Figure 2:
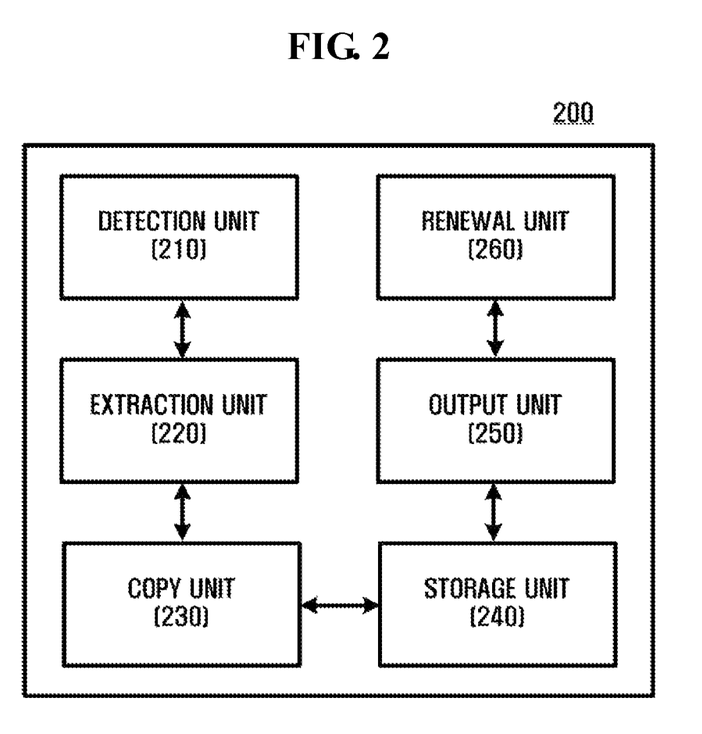
FIG. 2 is a block diagram of a content information output apparatus according to an exemplary embodiment of the present invention.

FIG. 2 is a block diagram of a content information output apparatus 200 according to an exemplary embodiment of the present invention.

The content information output apparatus 200 includes a detection unit 210, an extraction unit 220, a copy unit 230, a storage unit 240, an output unit 250, and a renewal unit 260. The content information output apparatus 200 may be generally implemented as an IPTV or a DTV. In the illustrated exemplary embodiment of the present invention, the content information output apparatus 200 will be explained with reference to an IPTV by way of example.

The detection unit 210 detects connection or disconnection of a source device (not shown). By way of example, the source device may be a mobile device such as a PDA, a PCS, a mobile phone, a PVR, a digital camera, an MP3 player, or the like. However, the present invention is not limited to these examples.

The extraction unit 220 extracts content stored in a source device and information related to the content from the source device. The content may include moving images, sound, music, voice, photos, and so on. The information related to the content may include attribute information of the content (e.g., file name, title, created date, modified date, version, type, file size, etc.), information related to the source device (e.g., device name, model name, serial number, manufacturer's name, manufacture date, etc.), and so on.

The copy unit 230 copies the content and the information related to the content, which are extracted by the extraction unit, to the storage unit 240. This process will be described in detail later.

The storage unit 240 stores the content and the information related to the content. The storage unit 240 may be incorporated into an IPTV. In alternative exemplary embodiments of the present invention, the storage unit 240 may be implemented as a home PC linked with the IPTV, or an external storage device.

Figure 3:
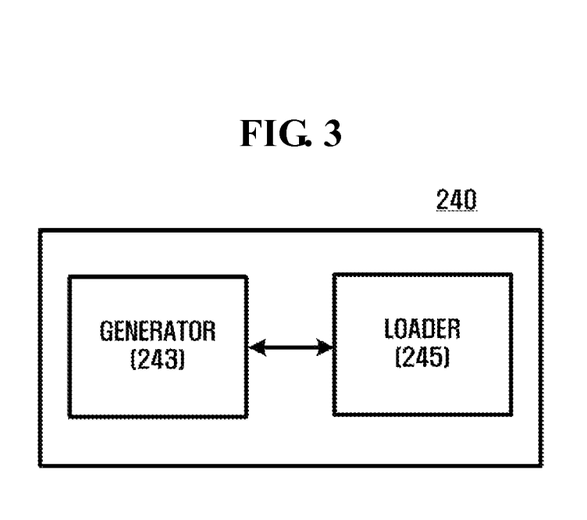
FIG. 3 is a block diagram of a storage unit according to an exemplary embodiment of the present invention.

As shown in FIG. 3, the storage unit 240 may include a generator 243 and a loader 245. Alternatively, the generator 243 and the loader 245 may be provided as units separate from the storage unit 240.

The generator 243 generates generate metadata associated with a source device based on the information related to the source device. Here, the metadata associated with the source device may include at least one of a device name, a model name, and a serial number. In addition, the generator 243 may generate metadata after classifying the information related to the content by date.

The loader 245 loads the metadata stored in the storage unit 240 and outputs the metadata to the output unit 250 to be described later. Here, the loader 245 sorts or classifies the metadata by source device and outputs the metadata to the output unit 250. In addition, the loader 245 loads the content corresponding to information on user's selected metadata on the display screen and provides the loaded content to the output unit 250. For example, if the type of source device, which is stored in the storage unit 240, is a folder, and the user selects a predetermined folder by a remote control, file names of content contained in the selected folder are output. If the user selects one of the output file names of content, the loader 245 loads the content corresponding to the selected file name and transmits the same to the output unit 250. In addition, in a case where the source device is disconnected from the IPTV, the loader 245 automatically loads metadata and outputs the metadata to the output unit 250. In other words, if a digital camera is connected to an IPTV, the content and the information related to the content, which are stored in the digital camera, are copied to the storage unit 240 and then used to generate metadata. Thereafter, in a case where the digital camera is disconnected from the IPTV, the loader 245 automatically loads content classified based on the metadata and displays the classified content on a display screen.

The output unit 250 outputs the content and the information related to the content on a display screen. Here, the output unit 250 may output the metadata on the display screen by source device, the metadata generated by the generator 243. The output unit 250 may be a module provided with image display means capable of receiving an input image signal, for example, a cathode ray tube (CRT), a liquid crystal display (LCD), a light-emitting diode (LED), an organic light-emitting diode (OLED) or a plasma display panel (PDP).

The renewal unit 260 renews the content and the information related to the content. In other words, when a source device is connected to the renewal unit 260, the content and the information related to the content stored in the source device are extracted. Based on the extracted data regarding the content and the information related to the content, the renewal unit 260 determines whether the extracted data is identical to the information stored in the storage unit 240. If the extracted data is not identical to the information stored in the storage unit 240, the renewal unit 260 renews the stored information. In this case, the renewal unit 260 may determine whether to renew the information stored in the storage unit 240 based on source device information, content version information, and so on. When it is necessary to renew the information stored in the storage unit 240, the renewal unit 260 allows the copy unit 230 to copy the extracted information from the source device to the storage unit 240.

Figure 4:
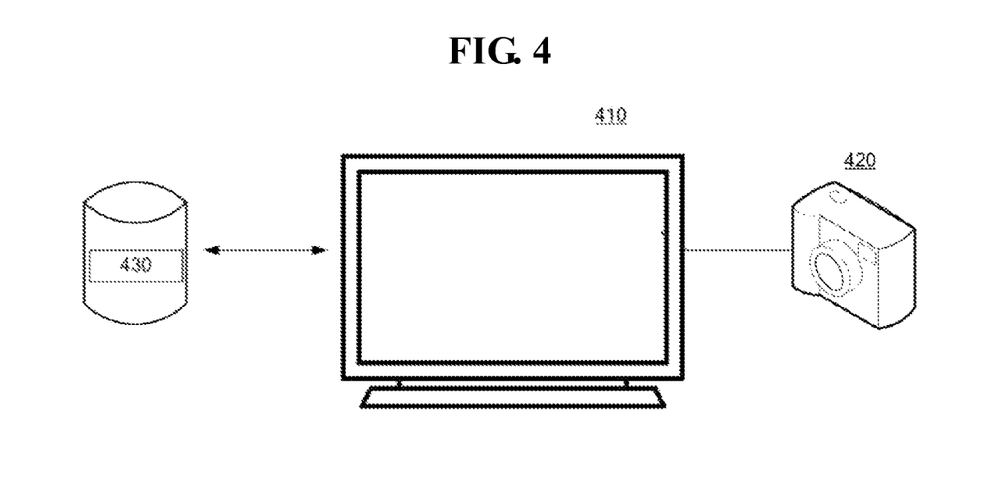
FIG. 4 is a diagram of a mobile device according to an exemplary embodiment of the present invention, illustrating contents and information related to the contents are stored in an external storage device.

FIG. 4 is a diagram of a mobile device according to an exemplary embodiment of the present invention, illustrating contents and information related to the contents are stored in an external storage device 430.

As shown in FIG. 4, when a digital camera 420 is connected to an IPTV 410, the IPTV 410 detects the connection of the digital camera 420. Then, the IPTV 410 extracts the content and the information related to the content stored in the digital camera 420. That is to say, in a case where multiple pictures were photographed by a user using the digital camera 420, the IPTV 410 may extract picture images and attribute information related to the picture images. In addition, the IPTV 410 may extract product information regarding the digital camera 420. The product information regarding the digital camera 420 may include a device name, a model name, a serial number, a manufacturer's name, a manufacture date, and so on.

Furthermore, the IPTV 410 stores the extracted content and information related to the content in the external storage device 430.

Accordingly, even if a source device, i.e., the digital camera 420, is disconnected from the IPTV 410, the user is able to load the content from the external storage device 430 to then output the same on a display screen of the IPTV 410.

Here, the content and the information related to the content stored in the external storage device 430 may be in the form of metadata.

Figure 5:
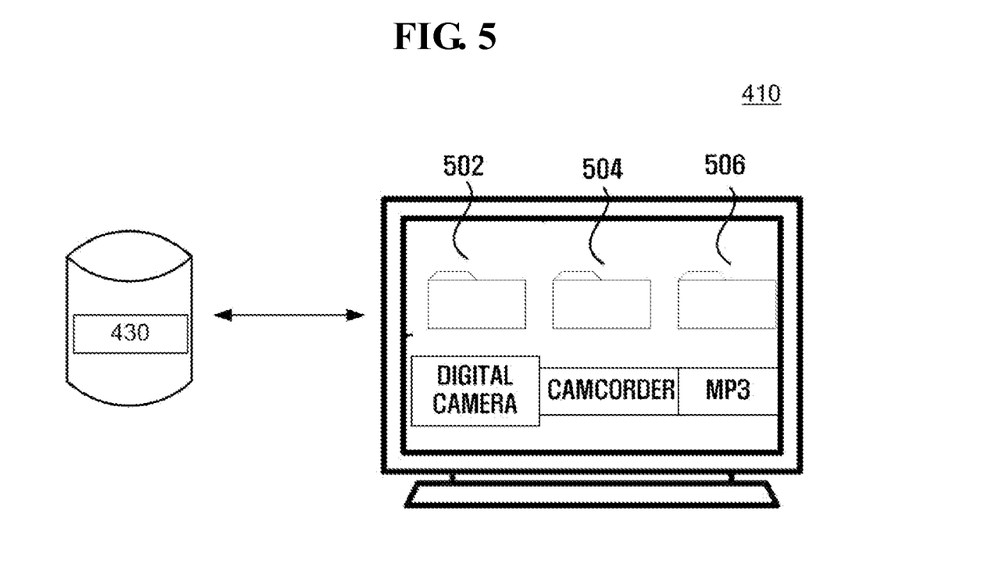
FIGS. 5, 6 and 7 illustrate various types of metadata output on an IPTV display screen according to an exemplary embodiment of the present invention.
Figure 6:
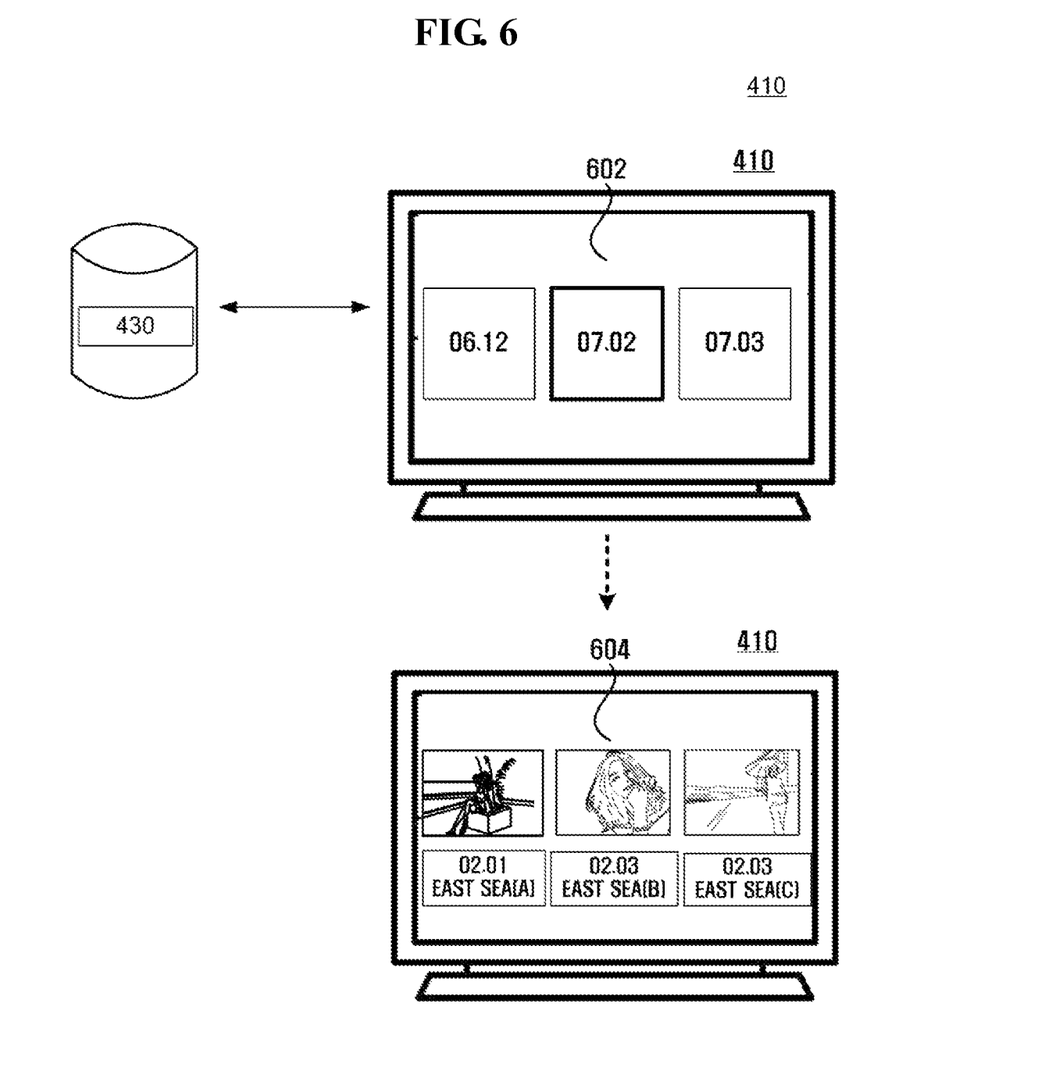
Figure 7:
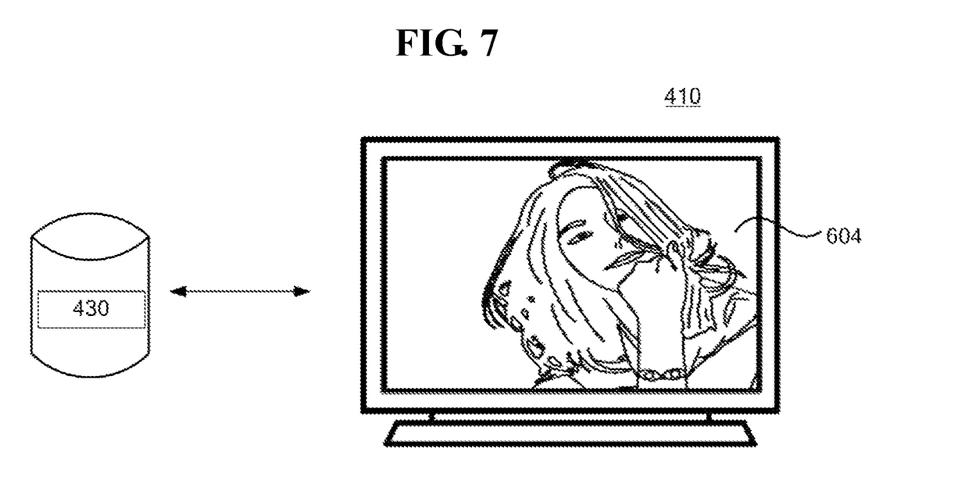

FIGS. 5, 6 and 7 illustrate various types of metadata output on a display screen of an IPTV 410 according to an exemplary embodiment of the present invention.

For purposes of explanation, it will be assumed that contents of the digital camera 420, a camcorder, and an MP3 player (source device) and information related to the contents are stored in the form of metadata in the external storage device 430. If a user actuates a button provided on a remote control, the metadata stored in the external storage device 430 are classified by the type of source device and then output on a display screen of the IPTV 410.

In other words, as shown in FIG. 5, folders having device names of digital camera 502, camcorder 504, and MP3 506, are generated and output on the display screen of the IPTV 410. The respective folders may contain information related to content.

As shown in FIG. 6, folders may be generated to be distinguished by creation date of content and then output on the display screen of the IPTV 410. For example, in a case where the user took photographs in December 2006, February 2007 and March 2007, folders distinguished by dates of the photographs taken may be generated and output on the display screen of the IPTV 410. The folders distinguished by date shown in FIG. 6, may be included in the folders distinguished by source device shown in FIG. 5.

If the user selects a particular folder, information related to content included in the content corresponding to the date are output on the display screen. For example, if the user selects a folder 602 indicating the date "07.02", photograph images taken on the corresponding date are output on the display screen. In this case, the photograph images may be arranged in the form of thumbnails.

As shown in FIG. 7, if the user selects a particular image 604, the selected image 604 is loaded from the external storage device 430 and output on the display screen. Moving image content may be loaded from the external storage device 430 and reproduced on the display screen to be offered to the user.

Figure 8:
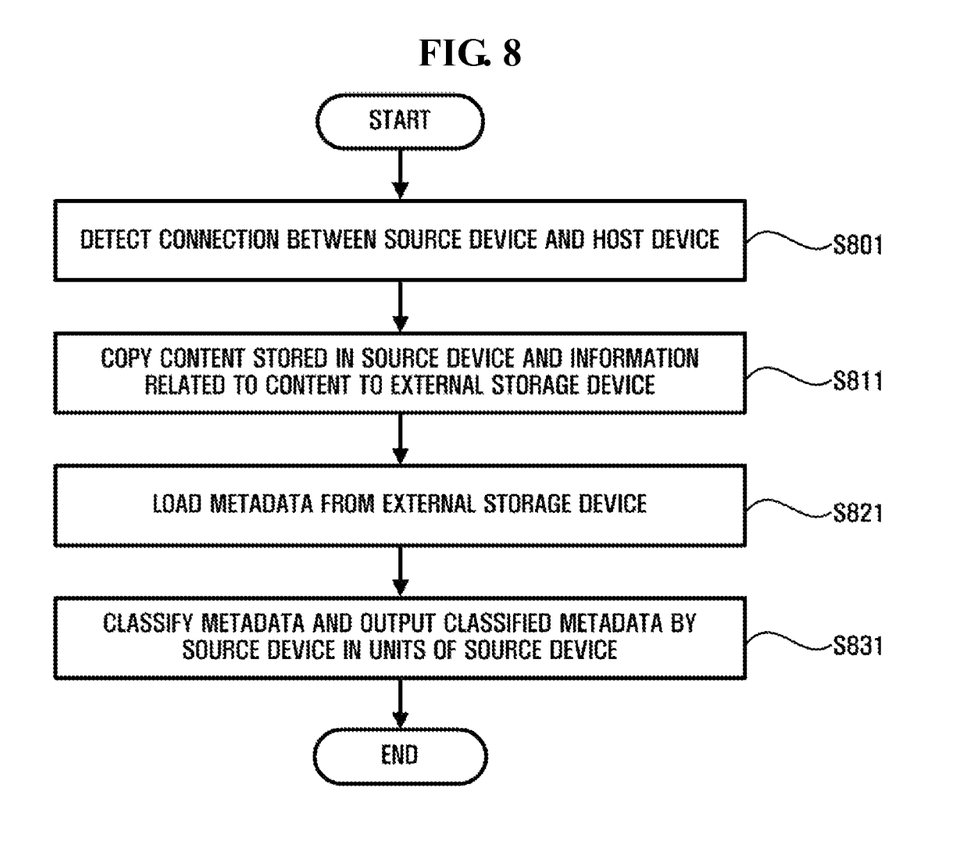
FIG. 8 is a flowchart illustrating sequential operations of storing contents and information related to the contents in an external storage device, generating the stored information in the form of metadata, and outputting the generated information on an IPTV display screen, according to an exemplary embodiment of the present invention.

FIG. 8 is a flowchart illustrating sequential operations of storing contents and information related to the contents in an external storage device, generating metadata related to the stored information, and outputting the generated information on an IPTV display screen, according to an exemplary embodiment of the present invention.

The detection unit 210 detects a connection of a source device in operation S801. For example, if the source device is connected to the IPTV 410 (i.e., a host device), the detection unit 210 detects the connection between the source device and the IPTV 410.

Then, the copy unit 230 copies the content and the information related to the content stored in the source device to the external storage device 430 in operation S811. Here, the information related to the content may be generated in the form of metadata and then stored in the external storage device 430.

In operation S821, the loader 245 loads the metadata related to the information related to the content from the external storage device 430.

Then, the loader 245 classifies the metadata by source device and the output unit 250 outputs the metadata on a display screen in operation S831.

Figure 9:
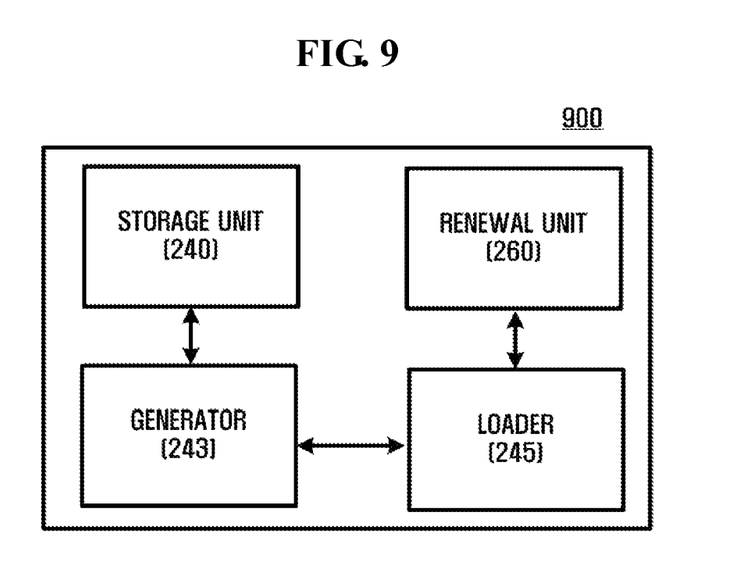
FIG. 9 is a block diagram of a content information output apparatus according to another exemplary embodiment of the present invention.

In another exemplary embodiment of the present invention, as shown in FIG. 9, a content information generating apparatus 900 may include a storage unit 240, a generator 243, a loader 245, and a renewal unit 260. The content information generating apparatus 900 may be incorporated into an IPTV or an external storage device.

The storage unit 240 stores content and information related to the content stored in a source device. The generator 243 generates metadata using the information related to the content. The loader 245 classifies the metadata by source device and outputs the metadata on a display screen. The renewal unit 260 renews the content and the information related to the content stored in the storage unit 240. For further details, the foregoing description will also be applied.

The term "unit", as used in herein, means, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to be executed on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. In addition, the components and units may be implemented such that they execute on one or more computers in a communication system.

An apparatus and method for outputting contents information according to the exemplary embodiments of the present invention may provide at least the following advantages.

First, if a source device is connected to an IPTV, content and information related to the content stored in the source device are automatically stored in an external storage device, so that content desired by a user can be executed even after the source device is disconnected from the IPTV.

Second, once a source device is connected to an IPTV, information related to content stored in the source device can be automatically output on a display screen.

Third, information related to content stored for multiple source devices can be classified by source device and then output on a display screen.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present exemplary embodiments be considered in all respects as illustrative and not restrictive, reference being made to the appended claims rather than the foregoing description to indicate the scope of the invention.

What is claimed is:

1. An apparatus for outputting content information, the apparatus comprising:
    a detection unit which detects a connection to a source device;
    an extraction unit which extracts content stored in the source device and information related to the content;
    a storage unit which stores the extracted content and stores information related to the extracted content as metadata;
    a loader which classifies, by source device, the metadata and which classifies the content based on the metadata; and
    an output unit which outputs the classified content on a display screen,
    wherein even after the connection of the source device is turned off, the loader sorts or classifies the metadata of the source device and outputs the metadata to the output unit, loads the content corresponding to information on user's selected metadata on the display screen and provides the loaded content to the output unit.

2. The apparatus of claim 1, wherein the metadata related to the source device comprises at least one of a device name, a model name, and a serial number of the source device.

3. The apparatus of claim 1 further comprising a renewal unit which renews the content and the metadata.

4. The apparatus of claim 1, wherein the loader automatically loads the classified content based on the metadata if the connection of the source device is not detected.

5. The apparatus of claim 1, further comprising a renewal unit which determines whether the extracted information is identical to information stored in the storage unit, and if it is determined that the extracted information is not identical to the information stored in the storage unit, the renewal unit renews the stored information.

6. A method for outputting content information, the method comprising:
   detecting a connection of a source device to an apparatus;
   extracting content stored in the source device and information related to the content;
   storing the extracted content and storing information related to the extracted content as metadata in a storage device;
   classifying, by source device, the metadata and classifying the content based on the metadata; and
   outputting the classified content on a display screen,
   wherein even after the connection of the source device is turned off, the classifying sorts or classifies the metadata of the source device and outputs the metadata, and the outputting loads the content corresponding to information on user's selected metadata on the display screen and outputs the loaded content.

7. The method of claim 6, wherein the metadata related to the source device comprises at least one of a device name, a model name, and a serial number of the source device.

8. The method of claim 6 further comprising renewing the content and the metadata.

9. The method of claim 6 further comprising determining whether the extracted information is identical to information stored in a storage unit, and if it is determined that the extracted information is not identical to the information stored in the storage unit, a renewal unit renews the stored information.

* * * * *